United States Patent
Liu et al.

(10) Patent No.: US 9,965,080 B2
(45) Date of Patent: May 8, 2018

(54) COLOR FILTER SUBSTRATE WITH PHOTOVOLTAIC CONVERSION LAYER, DISPLAY PANEL AND TOUCH DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Haodi Liu, Beijing (CN); Fan Li, Beijing (CN); Quanguo Zhou, Beijing (CN); Yun Qiu, Beijing (CN); Xiaojing Qi, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 379 days.

(21) Appl. No.: 14/437,151

(22) PCT Filed: Aug. 21, 2014

(86) PCT No.: PCT/CN2014/084880
§ 371 (c)(1),
(2) Date: Apr. 20, 2015

(87) PCT Pub. No.: WO2015/161594
PCT Pub. Date: Oct. 29, 2015

(65) Prior Publication Data
US 2016/0283011 A1  Sep. 29, 2016

(30) Foreign Application Priority Data
Apr. 24, 2014  (CN) .......................... 2014 1 0168145

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G02F 1/133514* (2013.01);
(Continued)

(58) Field of Classification Search
CPC ...... G06F 3/044; G06F 3/0412; G06F 3/0416; G06F 3/041; G06F 3/0414;
(Continued)

(56) References Cited

U.S. PATENT DOCUMENTS 8,547,504 B2 * 10/2013 Guo ................. G02B 5/008
  349/96
9,618,659 B2 * 4/2017 Yang .................... G02B 3/0037
(Continued)

FOREIGN PATENT DOCUMENTS

CN  102109701 A  6/2011
CN  202145301 U  2/2012
(Continued)

OTHER PUBLICATIONS

First Office Action regarding Chinese application No. 201410168145.2, dated Jul. 11, 2016. Translation provided by Dragon Intellectual Property Law Firm.
(Continued)

*Primary Examiner* — Nalini Mummalaneni
(74) *Attorney, Agent, or Firm* — Harness, Dickey & Pierce, P.L.C.

(57) ABSTRACT

The present disclosure relates to the field of touch display technology, and provides a color filter substrate, a display panel and a touch display device. The color filter substrate is provided with a power-generating-and-touch-detecting
(Continued)

module capable of working in a power-generating mode and a touch mode. The power-generating-and-touch-detecting module includes a photovoltaic conversion layer, and first electrodes and second electrodes located on opposite surfaces of the photovoltaic conversion layer and arranged crosswise. The first electrodes and the second electrodes have two modes: in one mode, they serve as electrodes for outputting electrical energy from a photovoltaic conversion module; while in the other mode, they serve as driving electrodes and sensing electrodes for touch control.

15 Claims, 1 Drawing Sheet

(51) Int. Cl.
  *G02F 1/1335* (2006.01)
  *G02F 1/133* (2006.01)
  *G09F 9/33* (2006.01)
(52) U.S. Cl.
  CPC ............ *G06F 3/041* (2013.01); *G06F 3/0412* (2013.01); *G09F 9/33* (2013.01); *G02F 2001/13324* (2013.01)
(58) Field of Classification Search
  CPC . G06F 2203/04103; G06F 2203/04111; G06F 2203/04112; G06F 2203/04107; G02F 2001/134372; G02F 2001/134318; G02F 2001/121; G02F 2001/123; G02F 2001/13312; G02F 2001/136222; G02F 2202/22; G02F 1/13338; G02F 1/133514; G02F 1/133512; G02F 1/134363; G02F 1/1368; G02F 1/136286; G02F 1/13439; G02F 1/134309; G02F 1/1333; G02F 1/133528; G02F 1/13394; G02F 1/13345; G02F 1/134336; G02F 1/136204; G02F 1/133516; G02F 1/136209; G02F 1/1343; H01L 27/323; H01L 27/322; H01L 51/5284; H01L 51/5203; G09G 3/3648; G09G 3/36; G09G 3/3655; G09G 3/3696; G09G 2300/0426
  See application file for complete search history.

(56) References Cited

U.S. PATENT DOCUMENTS

| | | | |
|---|---|---|---|
| 2009/0009483 A1* | 1/2009 | Hotelling | G06F 3/0416 345/173 |
| 2010/0078230 A1* | 4/2010 | Rosenblatt | G06F 3/041 178/18.01 |
| 2010/0238134 A1* | 9/2010 | Day | G06F 3/0412 345/174 |
| 2010/0245731 A1* | 9/2010 | Limketkai | G02B 5/201 349/106 |
| 2010/0304131 A1* | 12/2010 | Okai | B82Y 30/00 428/333 |
| 2011/0267305 A1* | 11/2011 | Shahparnia | G06F 3/0412 345/174 |
| 2011/0317121 A1* | 12/2011 | Lin | G02F 1/133512 349/158 |
| 2012/0103384 A1* | 5/2012 | Hsieh | G06F 3/038 136/244 |
| 2012/0169400 A1* | 7/2012 | Liu | G06F 3/0416 327/517 |
| 2013/0009883 A1 | 1/2013 | Chen | |
| 2013/0113727 A1* | 5/2013 | Lin | G06F 1/3262 345/173 |
| 2013/0147764 A1 | 6/2013 | Chaji et al. | |

FOREIGN PATENT DOCUMENTS

| | | | | |
|---|---|---|---|---|
| CN | 102902123 A | 1/2013 | | |
| CN | 102999220 A | 3/2013 | | |
| CN | 103207719 A | 7/2013 | | |
| CN | 103676361 A | 3/2014 | | |
| CN | 103677476 A | 3/2014 | | |
| CN | 103970351 A | 8/2014 | | |
| EP | 0163138 A1 * | 12/1985 | ........... | H03K 17/943 |

OTHER PUBLICATIONS

Written Opinion of the International Searching Authority for international application No. PCT/CN2014/084880.

* cited by examiner

COLOR FILTER SUBSTRATE WITH PHOTOVOLTAIC CONVERSION LAYER, DISPLAY PANEL AND TOUCH DISPLAY DEVICE

CROSS-REFERENCE TO RELATED APPLICATION

This application is the U.S. national phase of PCT Application No. PCT/CN2014/084880 filed on Aug. 21, 2014, which claims a priority to Chinese Patent Application No. 201410168145.2 filed on Apr. 24, 2014, the disclosures of which are incorporated in their entireties by reference herein.

TECHNICAL FIELD

The present disclosure relates to the field of touch display technology, in particular to a color filter substrate, a display panel and a touch display device.

BACKGROUND

With gradual development of technology, a touch screen has become a standard configuration of various portable electronic devices. And with more and more powerful processors of the portable electronic devices, there are more and more applications running on the portable electronic devices recently.

With more and more applications running on the portable electronic device, the touch screen is of bigger and bigger dimension, however, the portable electronic device is of a sharply rising trend in power consumption.

In the related art of rechargeable battery technology, a battery life of the existing rechargeable battery cannot meet users' needs. Taking an existing smartphone as an example, when users use the smartphone frequently (calling or running on some applications), the rechargeable battery usually cannot sustain a whole-day use.

In order to prolong the battery life of the portable electronic device, there is already related technology for combining a power-generating-and-touch-detecting module and the portable electronic device together, so as to supply part of electric power for the portable electric device by the power-generating-and-touch-detecting module.

In the related art of combining the power-generating-and-touch-detecting module and the portable electronic device together, a whole touch display device includes three sections: a display section, a touch section and a solar power-generating section. Such three sections are overlapped with each other, resulting in huge dimension and heavy weight of the whole touch display device, and not convenient for users to carry it.

SUMMARY

An object of the present disclosure is to provide a color filter substrate, a display panel and a touch display device, so as to reduce dimension and weight of the touch display device, thereby to facilitate users to carry it.

To achieve the above object, the present disclosure provides in embodiment a color filter substrate, including a base substrate with a color filter layer having a plurality of filtering units and a power-generating-and-touch-detecting module capable of working in a power-generating mode and a touch mode; the power-generating-and-touch-detecting module including:

a photovoltaic conversion layer;
a plurality of first electrodes, arranged in parallel on a first surface of the photovoltaic conversion layer; and
a plurality of second electrodes, arranged in parallel on a second surface of the photovoltaic conversion layer, the second surface being opposite to the first surface, the first electrodes and the second electrodes being arranged crosswise;

wherein in the power-generating mode, the first electrodes and the second electrodes output electrical energy obtained through conversion by the photovoltaic conversion layer through an electrical energy-outputting circuit;

in the touch mode, the photovoltaic conversion layer is cut-off in a direction from the first surface to the second surface, the first electrodes receive a touch-detection signal from a touch chip, and the second electrodes output a touch-sensing signal to the touch chip.

In the above color filter substrate, the power-generating-and-touch-detecting module and the color filter layer are arranged on opposite surfaces of the base substrate.

In the above color filter substrate, the power-generating-and-touch-detecting module is located between the filtering units.

In the above color filter substrate, the photovoltaic conversion layer is opaque.

In the above color filter substrate, the first electrodes and the second electrodes are connected to the electrical energy-outputting circuit through a first circuit provided with a first switch unit; the first electrodes and the second electrodes are connected to the touch chip through a second circuit provided with a second switch unit.

In the above color filter substrate, the photovoltaic conversion layer includes a P-type semiconductor layer and an N-type semiconductor layer; the first electrodes are arranged on a surface of the N-type semiconductor layer, and the second electrodes are arranged on a surface of the P-type semiconductor layer.

In order to achieve the above object, the present disclosure further provides in one embodiment a display panel, including the above color filter substrate.

In order to achieve the above object, the present disclosure further provides in one embodiment a touch display device, including a color filter substrate and an array substrate; the touch display device further including a power-generating-and-touch-detecting module capable of working in a power-generating mode and a touch mode; the power-generating-and-touch-detecting module including:

a photovoltaic conversion layer;
a plurality of first electrodes, arranged in parallel on a first surface of the photovoltaic conversion layer; and
a plurality of second electrodes, arranged in parallel on a second surface of the photovoltaic conversion layer, the second surface being opposite to the first surface, and the first electrodes and the second electrodes being arranged crosswise;

the touch display device further including:
an electrical energy-outputting circuit;
a touch chip;
a mode-control unit, configured to control a working mode of the power-generating-and-touch-detecting module;
wherein in the power-generating mode, the first electrodes and the second electrodes output electrical energy obtained through conversion by the photovoltaic conversion layer through the electrical energy-outputting circuit;
in the touch mode, the photovoltaic conversion layer is cut-off in a direction from the first surface to the second surface, the first electrodes receive a touch-detection signal from the touch chip, and the second electrodes output a touch-sensing signal to the touch chip.

In the above touch display device, the power-generating-and-touch-detecting module is arranged on the color filter substrate.

In the above touch display device, the touch display device further includes a protective glass plate, wherein the power-generating-and-touch-detecting module is arranged at a side of the protective glass plate close to the color filter substrate.

In the above touch display device, the color filter substrate further includes:
a base substrate;
a color filter layer including a plurality of filtering units and formed on the base substrate;
wherein the power-generating-and-touch-detecting module and the color filter layer are configured on opposite surfaces of the base substrate.

In the above touch display device, the power-generating-and-touch-detecting module is located between the filtering units.

In the above touch display device, the photovoltaic conversion layer is opaque.

In the above touch display device, the first electrodes and the second electrodes are connected to the electrical energy-outputting circuit through a first circuit provided with a first switch unit; the first electrodes and the second electrodes are connected to the touch chip through a second circuit provided with a second switch unit; and the mode-control unit is configured to control a working mode of the first electrode and the second electrode by controlling the first switch unit and the second switch unit.

In the above touch display device, the mode-control unit is integrated in the touch chip.

In the above touch display device, the photovoltaic conversion layer includes a P-type semiconductor layer and an N-type semiconductor layer; the first electrodes are arranged on a surface of the N-type semiconductor layer, and the second electrodes are arranged on a surface of the P-type semiconductor layer.

In the above touch display device, the mode-control unit is configured to control the first electrodes and the second electrodes to periodically change working modes.

In the above touch display device, the mode-control unit is configured to control the first electrodes and the second electrodes to be in the touch mode in a display state, and control the first electrodes and the second electrodes to be in the power-generating mode in a non-display state.

Embodiments of the present disclosure at least have following advantageous effects.

According to the embodiments of the present disclosure, the power-generating-and-touch-detecting module has two working modes: in one working mode, it may output electrical energy; while in the other working mode, it may cooperate with the touch chip for touch detection; therefore, in the whole touch display device, a photovoltaic conversion module and a touch-detecting module are an identical module in physical structure but work in different periods of time, thereby reducing dimension and weight of the touch display device and then facilitating users to carry it.

DETAILED DESCRIPTION

According to one embodiment of the present disclosure, a single module in physical structure may achieve both of a photovoltaic conversion function and a touch function by working in different periods of time, thereby reducing dimension and weight of a touch display device having a solar power-generating function and then facilitating users to carry it.

Specific embodiments of the present disclosure will be further described in details hereinafter in conjunction with the drawings and the embodiments. Following embodiments are for illustrating the present disclosure, but not intended to limit the scope of the present disclosure.

First Embodiment

Figure 1:
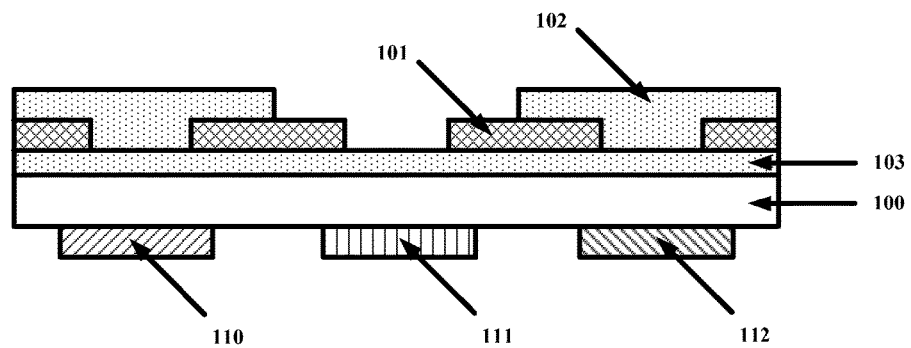
FIG. 1 is a schematic view of a color filter substrate in one embodiment of the present disclosure.

In order to achieve the above object, the present disclosure provides one embodiment of a color filter substrate. As shown in FIG. 1, the color filter substrate includes a base substrate 100 and a color filter layer including a plurality of filtering units (eg. a red filtering unit 110, a green filtering unit 111 and a blue filtering unit 112) and formed on the base substrate 100. The base substrate 100 is also provided with a power-generating-and-touch-detecting module. The power-generating-and-touch-detecting module includes:
a photovoltaic conversion layer 101, configured to convert light energy into electrical energy by means of photoelectric effect;
a plurality of first electrodes 102, arranged in parallel on a first surface of the photovoltaic conversion layer 101; and
a plurality of second electrodes 103, arranged in parallel on a second surface of the photovoltaic conversion layer 101 which is located oppositely to the first surface, i.e., the first electrodes 102 and the second electrodes 103 are arranged on opposite surfaces of the photovoltaic conversion layer 101, and the first electrodes 102 and the second electrodes 103 are arranged crosswise.

The first electrodes 102 and the second electrodes 103 have a first working mode and a second working mode. In the present disclosure, the first working mode is defined as a power-generating mode, and the second working mode is defined as a touch mode.

Figure 2:
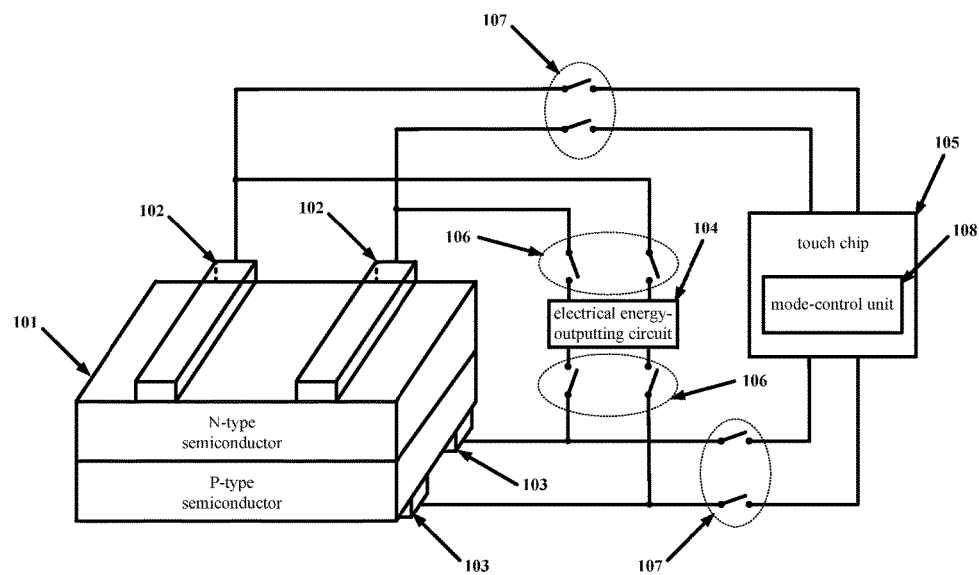
FIG. 2 is a schematic diagram showing a working principle of a power-generating-and-touch-detecting module in one embodiment of the present disclosure.

Also referring to FIG. 2, in the first working mode, the first electrodes 102 and the second electrodes 103 are connected to an electrical energy-outputting circuit 104, and serve as electrodes for outputting electrical energy from the photovoltaic conversion layer 101; the first electrodes 102 and the second electrodes 103, through the electrical energy-outputting circuit 104, output electrical energy obtained by the photovoltaic conversion layer 101, thereby to achieve the photovoltaic conversion function.

In the second working mode, the photovoltaic conversion layer 101 is cut-off in a direction from the first surface to the second surface and no longer performs the photovoltaic conversion, and the photovoltaic conversion layer 101 plays a role of insulation and isolation. The first electrodes 102 and the second electrodes 103 are connected to a touch chip 105. The first electrodes 102 are configured to receive a touch-detection signal from the touch chip 105, and serve as driving electrodes of touch control. The second electrodes 103 output a touch-sensing signal to the touch chip 105, and serve as sensing electrodes of touch control. A touch point is formed at each intersection of the first electrodes 102 and the second electrodes 103. Specifically, the first electrodes 102 and the second electrodes 103 may be numbered, for example, the first electrodes 102 are numbered as $X_1$, $X_2$, $X_3$, ... ; the second electrodes 103 are numbered as $Y_1$, $Y_2$, $Y_3$, ... ; and a touch point formed at an intersection of the first electrode 102 numbered as $X_n$ and the second electrode 103 numbered as $Y_n$ is represented as $X_nY_n$. Position coordinates corresponding to the touch point $X_nY_n$ are defined, and then the touch point $X_nY_n$ and its corresponding position coordinates are stored in the touch chip 105. After the first electrode 102 numbered as $X_n$ has received a touch-detection signal from the touch chip 105, the touch chip 105 receives a touch-sensing signal outputted from the second electrode 103 numbered as $Y_n$, and judges whether the touch point $X_nY_n$ is touched. When the touch point $X_nY_n$ is touched, the position coordinates of the touch point $X_nY_n$ are determined in accordance with the above stored correspondence. The touch chip 105 performs a corresponding operation in accordance with the position coordinates, to achieve the touch function.

The photovoltaic conversion layer 101 specifically may include a P-type semiconductor layer and an N-type semiconductor layer. A P-N junction is formed near an interface between the P-type semiconductor layer and the N-type semiconductor layer. When sunlight irradiates on the P-N junction of semiconductor, new hole-electron pairs are formed; under action of electric field of the P-N junction, photo-generated holes migrate to the P-type semiconductor layer, and photo-generated electrons migrate to the N-type semiconductor layer, then an electric current is formed after the circuit is turned on. This is the working principle of photoelectric solar cells.

The first electrodes 102 may be arranged on a surface of the N-type semiconductor layer; accordingly, the second electrodes 103 are arranged on a surface of the P-type semiconductor layer, as shown in FIG. 2. In the power-generating mode, the first electrodes 102 and the second electrodes 103 are connected to the electrical energy-outputting circuit 104, the electrical energy obtained through conversion by the photovoltaic conversion layer 101 is outputted through the electrical energy-outputting circuit 104. In the touch mode, by means of reverse cut-off characteristic of the P-N junction, a voltage applied to the first electrodes 102 is controlled to be greater than a voltage applied to the second electrodes 103, so as to ensure that the P-N junction is maintained in a cut-off state, the photovoltaic conversion layer 101 no longer performs the photovoltaic conversion and plays the role of insulation and isolation. A voltage difference of the first electrodes 102 and the second electrodes 103 is set below 5V, to ensure that the P-N junction may not break down reverse.

According to one embodiment of the present disclosure, the first electrodes and the second electrodes, located on opposite surfaces of the photovoltaic conversion layer and arranged crosswise, have two working modes. In one working mode, the first electrodes and the second electrodes serve as electrodes for outputting electrical energy from a photovoltaic conversion module. In the other working mode, the first electrodes and the second electrodes serve as driving electrodes and sensing electrodes for touch control, respectively. Therefore, in the whole touch display device, the photovoltaic conversion module and a touch-detecting module are an identical module in physical structure but work in different periods of time, thus the dimension and weight of the touch display device having a solar power generation function may be reduced, thereby to facilitate users to carry it.

As can be seen from FIG. 1, in one embodiment of the present disclosure, the power-generating-and-touch-detecting module and the color filter layer are arranged on opposite surfaces of the base substrate 100, respectively, i.e., the power-generating-and-touch-detecting module is arranged on a side of the color filter substrate away from the array substrate, and is located outside the display panel, thereby to improve sensitivity of the touch detection.

The photovoltaic conversion layer 101 of the power-generating-and-touch-detecting module may be located between the filtering units of the color filter layer. Specifically, as shown in FIG. 1, the photovoltaic conversion layer 101 may be located between the red filtering unit 110 and the green filtering unit 111, between the green filtering unit 111 and the blue filtering unit 112, and between the red filtering unit 110 and the blue filtering unit 112.

Further, the photovoltaic conversion layer 101 may be made of opaque material, for example, opaque material having relative higher photoelectric conversion efficiency, such as a-Si/uc-Si/CIGS/GaAs/CdTe. By accurately aligning the photovoltaic conversion layer 101 to a black matrix region of the color filter substrate, the photovoltaic conversion layer 101 may be used as the black matrix, thereby to omit a process of manufacturing a black matrix. Since the photovoltaic conversion layer 101 and the filtering units are located at opposite surfaces of the base substrate 100, in order to guarantee normal display when viewing obliquely, an area covered by the photovoltaic conversion layer 101 may be appropriately enlarged.

For increasing power-generating efficiency, an outer frame of the display panel, which is not the display region, is also provided with the photovoltaic conversion layer. The photovoltaic conversion layer is leaded out to the electrical energy-outputting circuit 104 through a wire-welding region designed in the outer frame, so as to output the electrical energy obtained through conversion.

Because the whole power-generating-and-touch-detecting module has two working modes including the power-generating mode and the touch mode, it is required to achieve switching between the two working modes. In the power-generating mode, the first electrodes 102 and the second electrodes 103 are connected to the electrical energy-outputting circuit 104 and output electrical energy obtained through conversion by the photovoltaic conversion layer 101. In the touch mode, the first electrodes 102 and the second electrodes 103 are connected to the touch chip 105, and the photovoltaic conversion layer 101 no longer performs the photovoltaic conversion; the first electrodes 102 receive the touch-detection signal from the touch chip 105, and the second electrodes 103 output the touch-sensing signal to the touch chip 105.

To achieve the above object, as shown in FIG. 2, in the present embodiment, a first switch 106 is provided in a circuit connecting the first electrodes 102 and the electrical energy-outputting circuit 104, and a circuit connecting the second electrodes 103 and the electrical energy-outputting circuit 104, respectively. A second switch 107 is provided in a circuit connecting the first electrodes 102 and the touch chip 105, and a circuit connecting the second electrodes 103 and the touch chip 105, respectively. Specifically, in the power-generating mode, the first switches 106 are closed and the second switches 107 are disconnected; while in the touch mode, the second switches 107 are closed and the first switches 106 are disconnected.

The function of switching the working modes of the first electrodes 102 and the second electrodes 103 (the power-generating mode when being connected to the electrical energy-outputting circuit 104; or the touch mode when being connected to the touch chip 105) may be achieved by the touch chip 105. There are various modes of the switching, and examples are as below.

Mode 1: when the display device is in a display state, the first switches 106 are kept in a disconnected state, and the second switches 107 are closed, thereby to maintain the touch mode; when the display device is not in the display state, the first switches 106 are closed, and the second switches 107 are kept in the disconnected state, thereby to maintain the power-generating mode.

Mode 2: the first switches 106 and the second switches 107 are closed or disconnected at different periods of time, thereby to be in the closed state or in the disconnected state alternately.

The above-mentioned are merely examples for illustration, but not intended to limit that the first electrodes 102 and the second electrodes 103 only work in the above two working modes.

Second Embodiment

The present disclosure further provides in the present embodiment a display panel, which includes a color filter substrate and an array substrate which are arranged oppositely to form a cell. The color filter substrate adopts the color filter substrate in the first embodiment.

Since the photovoltaic conversion module and the touch-detecting module are arranged on the color filter substrate, and are an identical module in physical structure but work in different period of time, thus the dimension and weight of the touch display device having a solar power-generating function may be reduced, thereby to facilitate users to carry it.

Third Embodiment

The present disclosure further provides in the present embodiment a touch display device, which includes a color filter substrate and an array substrate. A power-generating-and-touch-detecting module capable of working in a power-generating mode and a touch mode is provided on the color filter substrate. Specific structure of the power-generating-and-touch-detecting module may refer to the first embodiment.

Also referring to FIG. 2, the touch display device further includes an electrical energy-outputting circuit 104, a touch chip 105 and a mode-control unit 108. The mode-control unit 108 is configured to control the power-generating-and-touch-detecting module to work in a power-generating mode or a touch mode.

In the power-generating mode, the power-generating-and-touch-detecting module serves as the photovoltaic conversion module; the first electrodes 102 and the second electrodes 103 serve as electrodes for outputting electrical energy from the photovoltaic conversion layer 101, and output electrical energy obtained through conversion by the photovoltaic conversion layer 101 through the electrical energy-outputting circuit 104.

In the touch mode, the power-generating-and-touch-detecting serves as the touch module; the photovoltaic conversion layer 101 is cut-off in a direction from the first surface to the second surface, no longer performs the photovoltaic conversion, and plays a role of insulation and isolation. The first electrodes 102 are configured to receive a touch-detection signal from the touch chip 105, serving as driving electrodes of touch control; and the second electrodes 103 are configured to output the touch-detection signal to the touch chip 105, serving as sensing electrodes of touch control.

The photovoltaic conversion layer 101 specifically may include a P-type semiconductor layer and an N-type semiconductor layer. A P-N junction is formed near an interface between the P-type semiconductor layer and the N-type semiconductor layer. The first electrodes 102 may be arranged on a surface of the N-type semiconductor layer; accordingly, the second electrodes 103 are arranged on a surface of the P-type semiconductor layer, as shown in FIG. 2. In the power-generating mode, the first electrodes 102 and the second electrodes 103 are connected to the electrical energy-outputting circuit 104, the electrical energy obtained through conversion by the photovoltaic conversion layer 101 is outputted through the electrical energy-outputting circuit 104. In the touch mode, by means of reverse cut-off characteristic of the P-N junction, a voltage applied to the first electrodes 102 is controlled to be greater than a voltage applied to the second electrodes 103, so as to ensure that the P-N junction is maintained in a cut-off-state, the photovoltaic conversion layer 101 no longer performs the photovoltaic conversion and plays the role of insulation and isolation. A voltage difference of the first electrodes 102 and the second electrodes 103 is set below 5 V, to ensure that the P-N junction may not break down reverse.

In one technical solution of the present disclosure, in the whole touch display device, the photovoltaic conversion module and the touch-detecting module are formed on the color filter substrate, and are an identical module in physical structure but work in different period of time, thus, the dimension and weight of the touch display device having a solar power-generating function may be reduced, thereby to facilitate users to carry it.

The color filter substrate includes the base substrate 100 and a color filter layer including a plurality of filtering units (e.g. the red filtering unit 110, the green filtering unit 111, and the blue filtering unit 112).

As shown in FIG. 1, in the present embodiment, the power-generating-and-touch-detecting module and the color filter layer are arranged on opposite surfaces of the base substrate, respectively, i.e., the power-generating-and-touch-detecting module is located outside the display device, and sensitivity of the touch detection may be improved.

Further, a protective glass plate may also be arranged at an outer side of the power-generating-and-touch-detecting module, i.e., the protective glass plate is located at a side of the color filter substrate away from the array substrate, so as to protect the power-generating-and-touch-detecting module. The power-generating-and-touch-detecting module may also be arranged at a side of the protective glass plate close to the color filter substrate.

The photovoltaic conversion layer 101 of the power-generating-and-touch-detecting module may be located between the filtering units of the color filter layer. Specifically, as shown in FIG. 1, the photovoltaic conversion layer 101 may be located between the red filtering unit 110 and the green filtering unit 111, between the green filtering unit 111 and the blue filtering unit 112, and between the red filtering unit 110 and the blue filtering unit 112.

Further, the photovoltaic conversion layer 101 may be made of opaque material, for example, opaque material having relative higher photoelectric conversion efficiency, such as a-Si/uc-Si/CIGS/GaAs/CdTe. By accurately aligning the photovoltaic conversion layer 101 to a black matrix region of the color filter substrate, the photovoltaic conversion layer 101 may be served as the black matrix, thereby to omit a process of manufacturing a black matrix.

Because the whole power-generating-and-touch-detecting has two working modes including the power-generating mode and the touch mode, it is required to achieve switching between the two working modes. In the power-generating mode, the first electrodes 102 and the second electrodes 103 are connected to the electrical energy-outputting circuit 104 and output electrical energy obtained through conversion by the photovoltaic conversion layer 101. In the touch mode, the first electrodes 102 and the second electrodes 103 are connected to the touch chip 105, and the photovoltaic conversion layer 101 no longer performs the photovoltaic conversion; the first electrodes 102 receive the touch-detection signal from the touch chip 105, and the second electrodes 103 output the touch-sensing signal to the touch chip 105.

To achieve the above object, as shown in FIG. 2, in the present embodiment, a first switch 106 is provided in a circuit connecting the first electrodes 102 and the electrical energy-outputting circuit 104, and a circuit connecting the second electrodes 103 and the electrical energy-outputting circuit 104, respectively. A second switch 107 is provided in a circuit connecting the first electrodes 102 and the touch chip 105, and a circuit connecting the second electrodes 103 and the touch chip 105, respectively. Specifically, in the power-generating mode, the first switches 106 are closed and the second switches 107 are disconnected; while in the touch mode, the second switches 107 are closed and the first switches 106 are disconnected.

There are various modes for switching the working modes of the first electrodes 102 and the second electrodes 103 (the power-generating mode when being connected to the electrical energy-outputting circuit 104; or the touch mode when being connected to the touch chip 105). In the present embodiment, the mode-control unit 108, which is configured to control the working modes of the power-generating-and-touch-detecting module, specifically may be configured to control the first electrodes 102 and the second electrodes 103 to periodically change working modes; or may be configured to control the first electrodes 102 and the second electrodes 103 to be in the touch mode in the display state, otherwise control the first electrodes 102 and the second electrodes 103 to be in the power-generating mode.

Specifically, the mode-control unit 108 may be integrated in the touch chip 105.

In the present embodiment of the present disclosure, the first electrodes and the second electrodes, located on opposite surfaces of the photovoltaic conversion layer and arranged crosswise, have two working modes. In one working mode, the first electrodes and the second electrodes serve as electrodes for outputting electrical energy from the photovoltaic conversion module; while in the other working mode, the first electrodes and the second electrodes serve as driving electrodes and sensing electrodes for touch control, respectively. Therefore, in the whole touch display device, the photovoltaic conversion module and the touch-detecting module are an identical module in physical structure but work in different periods of time, thus the dimension and weight of the touch display device having a solar power generation function may be reduced, thereby to facilitate users to carry it.

It should note that embodiments of the present disclosure take the first electrodes and the second electrodes being of a bar-like shape as examples for illustrations, but not intended to limit to them, which may also be of a diamond-like shape, etc., as long as the electrode configuration may achieve the touch function and the electrical energy-outputting function.

The above are merely the optional embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A color filter substrate, comprising a base substrate with a color filter layer having a plurality of filtering units and a power-generating-and-touch-detecting module capable of working in a power-generating mode and a touch mode; the power-generating-and-touch-detecting module comprising:
   a photovoltaic conversion layer located between the plurality of filtering units;
   a plurality of first electrodes, arranged in parallel on a first surface of the photovoltaic conversion layer; and
   a plurality of second electrodes, arranged in parallel on a second surface of the photovoltaic conversion layer, the second surface being opposite to the first surface, the first electrodes and the second electrodes being arranged crosswise;
   wherein in the power-generating mode, the first electrodes and the second electrodes output electrical energy obtained through conversion by the photovoltaic conversion layer through an electrical energy-outputting circuit; and
   in the touch mode, the photovoltaic conversion layer is cut-off in a direction from the first surface to the second surface, the first electrodes receive a touch-detection signal from a touch chip, and the second electrodes output a touch-sensing signal to the touch chip.

2. The color filter substrate according to claim 1, wherein the power-generating-and-touch-detecting module and the color filter layer are arranged on opposite surfaces of the base substrate.

3. The color filter substrate according to claim 1, wherein the photovoltaic conversion layer is opaque.

4. The color filter substrate according to claim 1, wherein the first electrodes and the second electrodes are connected to the electrical energy-outputting circuit through a first circuit having a first switch unit; and the first electrodes and the second electrodes are connected to the touch chip through a second circuit provided with a second switch unit.

5. The color filter substrate according to claim 1, wherein the photovoltaic conversion layer comprises a P-type semiconductor layer and an N-type semiconductor layer; the first electrodes are arranged on a surface of the N-type semiconductor layer; and the second electrodes are arranged on a surface of the P-type semiconductor layer.

6. A display panel, comprising the color filter substrate according to claim 1.

7. A touch display device, comprising a color filter substrate and an array substrate; the touch display device further comprising a power-generating-and-touch-detecting module arranged on the color filter substrate and capable of working in a power-generating mode and a touch mode; the power-generating-and-touch-detecting module comprising:
   a photovoltaic conversion layer, wherein the color filter substrate comprises a base substrate with a color filter layer having a plurality of filtering units and the photovoltaic conversion layer is located between the plurality of filtering units;

a plurality of first electrodes, arranged in parallel on a first surface of the photovoltaic conversion layer; and a plurality of second electrodes, arranged in parallel on a second surface of the photovoltaic conversion layer, the second surface being opposite to the first surface, and the first electrodes and the second electrodes being arranged crosswise, the touch display device further comprising:

an electrical energy-outputting circuit;

a touch chip; and a mode-control unit, configured to control a working mode of the power-generating-and-touch-detecting module, wherein in the power-generating mode, the first electrodes and the second electrodes output electrical energy obtained through conversion by the photovoltaic conversion layer through the electrical energy-outputting circuit; and in the touch mode, the photovoltaic conversion layer is cut-off in a direction from the first surface to the second surface, the first electrodes receive a touch-detection signal from the touch chip, and the second electrodes output a touch-sensing signal to the touch chip.

8. The touch display device according to claim 7, further comprising a protective glass plate; wherein the protective glass plate is located at a side of the color filter substrate away from the array substrate; and the power-generating-and-touch-detecting module is arranged at a side of the protective glass plate close to the color filter substrate.

9. The touch display device according to claim 7, wherein the color filter substrate comprises:

a base substrate; and a color filter layer comprising a plurality of filtering units and formed on the base substrate, wherein the power-generating-and-touch-detecting module and the color filter layer are arranged on opposite surfaces of the base substrate.

10. The touch display device according to claim 7, wherein the photovoltaic conversion layer is opaque.

11. The touch display device according to claim 7, wherein the first electrodes and the second electrodes are connected to the electrical energy-outputting circuit through a first circuit provided with a first switch unit; the first electrodes and the second electrodes are connected to the touch chip through a second circuit provided with a second switch unit; and the mode-control unit is configured to control a working mode of the first electrodes and the second electrodes by controlling the first switch unit and the second switch unit.

12. The touch display device according to claim 11, wherein the mode-control unit is integrated in the touch chip.

13. The touch display device according to claim 11, wherein the photovoltaic conversion layer comprises a P-type semiconductor layer and an N-type semiconductor layer; the first electrodes are arranged on a surface of the N-type semiconductor layer; and the second electrodes are arranged on a surface of the P-type semiconductor layer.

14. The touch display device according to claim 7, wherein the mode-control unit is configured to control the first electrodes and the second electrodes to periodically change working modes.

15. The touch display device according to claim 7, wherein the mode-control unit is configured to control the first electrodes and the second electrodes to be in the touch mode in a display state, and control the first electrodes and the second electrodes to be in the power-generating mode in a non-display state.

* * * * *